Aug. 24, 1926.
C. STEENSTRUP
1,597,488
METHOD OF BRAZING
Filed Jan. 25, 1924
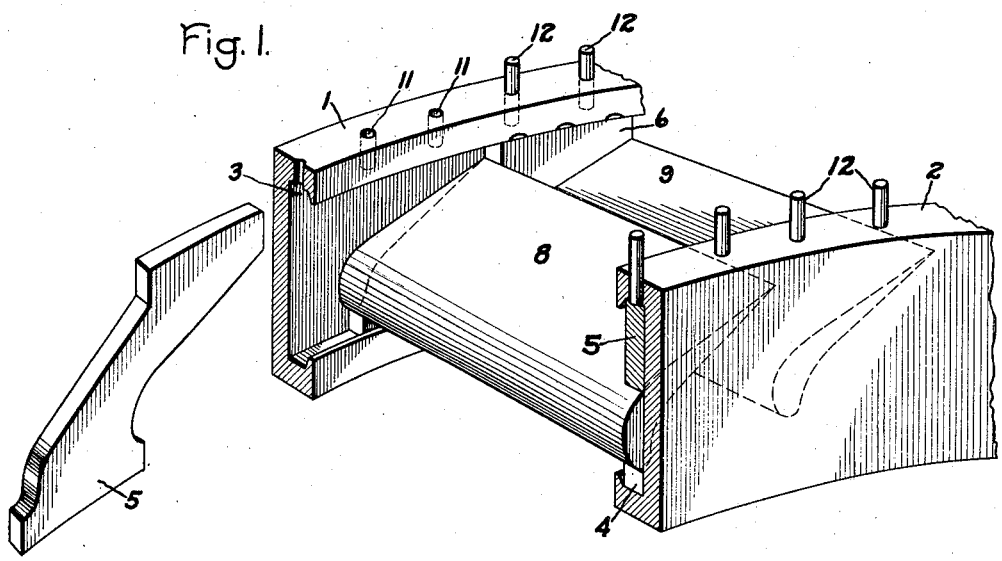
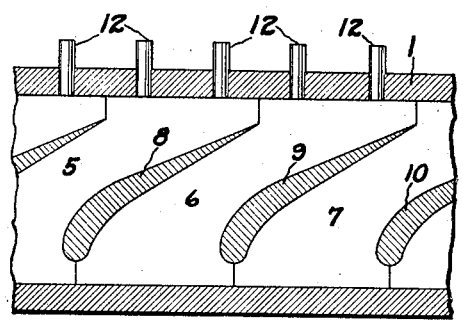
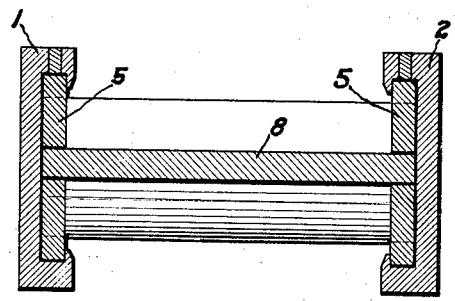
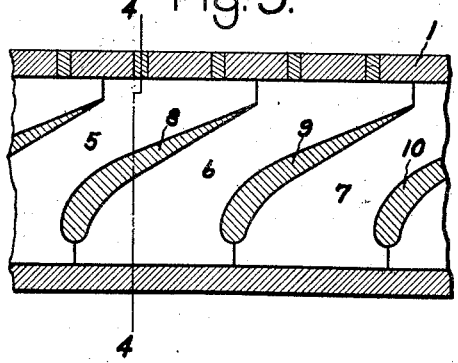
Inventor:
Christian Steenstrup,
by *Alexander F. Lunt*
His Attorney.

Patented Aug. 24, 1926.

1,597,488

UNITED STATES PATENT OFFICE.

CHRISTIAN STEENSTRUP, OF SCHENECTADY, NEW YORK, ASSIGNOR TO GENERAL ELECTRIC COMPANY, A CORPORATION OF NEW YORK.

METHOD OF BRAZING.

Application filed January 25, 1924. Serial No. 688,617.

The present invention relates to the process of joining metal objects to one another by a fused metal of lower melting point, a process which has become known by the general term "brazing," from the early use of brass for this purpose.

When, as described in my Patent #1,528,581, issued March 3, 1925, copper is used as the brazing metal, and the operation is carried out in a reducing atmosphere, joints or welds of great strength can be made by fitting the surfaces to be joined with care and holding the parts to be welded into close contact by a sustained pressure during the fusion of the copper. The fused copper ordinarily will penetrate the minutest crevices over their entire extent thus permitting the application of the copper from the exterior into the desired joint, in the presence of a reducing gas, such as hydrogen, molten copper appears to possess extreme mobility and a low surface tension so as to penetrate the minutest crevices.

In the art of copper brazing it is customary to place the copper constituting the brazing metal in the most convenient place, and to depend upon the molten copper to find its way into each individual joint by flowing along the external boundary of the members to be brazed. When steel members are joined this method is entirely satisfactory, but when one of the parts to be brazed is an alloy containing a constituent which is readily soluble in copper, as for instance, the alloy of nickel and copper known as Monel metal, then this method cannot be used successfully. When copper is placed on the external boundary of the Monel metal member and a steel member, the copper will not flow satisfactorily when melted, owing to the fact that it immediately commences to dissolve nickel from the Monel metal, which instantly raises the melting point of the copper and makes it more sluggish in its action. While the copper alloyed with nickel will flow along the Monel metal member until it reaches the steel member, it becomes progressively more sluggish so that it will not flow into the minute crevice between the members. On the contrary, it accumulates or piles up against the steel and by so doing continues to absorb nickel from the Monel metal. When the Monel metal member is comparatively thin entirely or in part, the copper will eat its way through the thin part of the Monel metal at the external boundary of the steel so that in the complete article the thinner portions of the Monel metal member will be severed as though cut away with a saw. Even when the Monel metal member is too heavy to be severed, it is weakened by being cut to a considerable depth. This cutting effect is not always visible by inspection so that when articles brazed in this manner come from the furnace, the union looks to be reasonably good, but if the fillet of copper accumulated against the external boundary of the members is removed it is found there is practically no union present. It is obvious that a defective weld of this sort is a source of great danger in rapidly moving machinery such, for example, as turbine parts.

In my Patent #1,528,581 I have described and claimed a method of carrying out brazing by fusion of copper, or other metal, whereby copper is placed in a cavity within the boundaries of two surfaces to be joined. This method will prevent the external weakening of one of the members when the above-described conditions exist, but by my present invention I have provided as a further improvement a method which is particularly applicable to welding three or more parts one of which is readily alloyable whereby the copper, or other brazing metal, is supplied to all the juxtaposed surfaces without first flowing over the surface of a markedly alloyable member.

In accordance with my invention, sound strong welds can be produced when a metal is present in the members to be united which will alloy readily with the brazing metal, by placing the alloying metal in a cavity in one of said members which is accessible both to a joint between this member containing an alloying constituent and other members and also to adjoining crevices between members not so readily alloyable so that the brazing metal will reach all parts of the weld without first altering its constitution by alloyage. For example, in the case of steel and Monel metal members, copper by first flowing over the steel or other less alloyable material, will thoroughly unite these parts, and when the residue of copper which has followed along the surface of the steel finally penetrates between the steel and the Monel metal, the amount of copper has been so reduced that it does not appear to alloy in the same manner with nickel as when larger quantities of copper are present, as above described.

My invention will be better understood by reference to the accompanying drawing. Fig. 1 of the drawing is a perspective view of a turbine nozzle member in the construction of which my invention may be utilized; Figs. 2 and 3 are sectional views taken at right angles to the nozzle members to show the relation of the parts before and after brazing, and Fig. 4 is a sectional view along the lines 4—4 of Fig. 3.

In order that my invention may be understood, I will explain how it may be carried out in the manufacture of turbine elements of the character described in my prior Patent 1,470,508, of October 9, 1923. The device shown in Fig. 1 is a portion of a fluid directing device, such as used in turbine nozzles. It comprises supporting members 1, 2, shown in part broken away, and consisting of a segment of an annular structure forming part of a turbine wheel. These members are provided respectively with grooves 3, 4, which are shaped to receive spacing members 5, 6, 7, etc. (Fig. 2) constructed to hold in fixed position the ends of nozzle partitions 8, 9, 10, etc. The supports 1 and 2 and the spacing members 5, 6, 7 ordinarily consist of steel. The partitions 8, 9, 10 consist of Monel metal.

The nozzle partitions are assembled between the spacers, as indicated in Fig. 1, and as described more in detail in my prior Patent 1,470,508. The spacers are driven into place to make a firm close contact. If copper were placed along the outer edge of the nozzle partitions at the exposed junction with the supporting members, the difficulties due to alloyage, as noted above, would occur.

In accordance with my invention, cavities or recesses are provided in the members 1, 2, as indicated at 11, Fig. 1, which have access to the junction surface or contacting faces of the members to be brazed together. Into these recesses pins 12, 12 consisting of copper are placed (Figs. 2 and 4), and the entire device is heated in hydrogen to the melting point of copper. The molten copper penetrates the crevices between the juxtaposed parts which are intended to be joined, that is, between the contacting faces of the holders 1, 2, and the spacers 5, 6, 7, etc. and also penetrates from the interior of the assembled parts over the surface of the Monel metal partitions 8, 9, 10, etc. In case any alloyage occurs between the copper and the nickel in the Monel metal, no weakening occurs of the exposed part of the partition. As the copper does not have to flow over the Monel metal to get to the steel surfaces, a firm joint or braze between the steel surfaces is insured. Moreover, when the copper thus is supplied from a point remote from the exterior boundary of the welded parts, that is, from the interior of the socket member into which the alloyable parts are to be brazed, a firm union is produced. As already explained, the copper penetrates a greater distance over the Monel metal when supplied from the interior than when supplied from the exterior. The appearance of the finished article is shown in Figs. 3 and 4, the welded junctions being indicated by heavy lines.

What I claim as new and desire to secure by Letters Patent of the United States, is,—

1. The method of brazing metal members which have been assembled in closely fitting relation and one of which is alloyable to a marked degree with the brazing metal which consists in supplying brazing metal to said members at a region permitting said brazing metal to be supplied to juxtaposed parts intended to be joined without first flowing over the surface of said markedly alloyable member.

2. The method of joining by a brazing metal members one of which contains a constituent which is alloyable with said brazing metal which consists in providing in one of said members a cavity which affords access from the exterior to a crevice between the members to be brazed at a point remote from the exterior junction of said members, and placing the brazing metal in said cavity after said members have been assembled and preliminary to fusion.

3. The method of joining metal members one of which comprises Monel metal and another consisting of steel which consists in providing in said steel member a cavity communicating both with the exterior and with crevices between surfaces to be joined at a region remote from the external boundary of said members, placing a quantity of copper in said cavity and fusing said copper in a hydrogen atmosphere.

4. In the method of brazing by copper three or more members one of which contains a substantial proportion of metal which is readily alloyable with copper, the others consisting of steel, the step which consists in providing a quantity of copper in a cavity in one of said steel members in communication both with crevices between steel members and crevices between the alloyable metal and steel members and remote from the exterior boundary of said members.

5. The method of joining by brazing a member of Monel metal to a plurality of steel members which consists in providing a duct in one of said steel members communicating both with crevices between said steel members and between the Monel member and adjoining steel members and providing molten copper through said duct to said crevices in a reducing atmosphere.

6. The method of joining by fusion of copper a plurality of contacting metal members, some of which consist of ferrous metal and at least one of which consists of a metal alloyable with copper which consists in admitting fused copper under reducing conditions to the crevices between said ferrous members at a region removed from the metal which is alloyable with copper.

7. The method of brazing metal members which have been assembled in closely fitting relation, one of which is a copper-nickel alloy and the other a ferrous metal which comprises providing a duct in said ferrous metal communicating with the crevice between the ferrous metal and said alloy, and supplying molten copper through said duct to said crevice in a reducing atmosphere.

In witness whereof, I have hereunto set my hand this 24th day of January, 1924.

CHRISTIAN STEENSTRUP.